United States Patent Office 3,053,618
Patented Sept. 11, 1962

3,053,618
METHOD FOR MAKING TITANIUM, ZIRCONIUM AND TIN TELLURITES
Gerhard Bayer, Hinteregg, Zurich, Switzerland, assignor to Owens-Illinois Glass Company, a corporation of Ohio
No Drawing. Original application Nov. 23, 1960, Ser. No. 71,142. Divided and this application Dec. 22, 1961, Ser. No. 167,207
3 Claims. (Cl. 23—50)

This invention relates to new metal tellurites, and to methods for their preparation.

This application is a division of copending application Serial Number 71,142, filed November 23, 1960.

An object of the present invention is to provide new crystalline compounds, tellurites of titanium, zirconium and tin. Another object of the invention is to provide methods for the production of these new compounds. Still another object of the invention is to provide new ceramic pigments. Other objects of the invention will become apparent from a study of the accompanying disclosure.

According to the present invention, I have now discovered new metal tellurites of the formula $$ATe_3O_8$$

wherein A is selected from the group consisting of Ti, Zr and Sn. These compounds have very desirable colors, the titanium compound being a bright, lemon-yellow color, the tin compound a cream-yellow, and the zirconium compound being white. In the compounds both A and Te are in the +4 valence state.

According to the invention, the new compounds can be prepared by mixing powders of $TeO_2$ with $AO_2$, and carrying out a solid-state reaction. To obtain the compounds in substantially pure form, the ratio of the oxides should be substantially 3:1 of $TeO_2$ to $AO_2$, but higher or lower ratios can be employed; however, when so employed the tellurite compounds are diluted with either $TeO_2$ or $AO_2$, as shown by X-ray powder diffraction data on samples prepared at other ratios. In preparing the compounds, the reactants are intimately admixed in finely powder form; preferably the powders are 30 microns or smaller. The intimately admixed powders are compacted into a cohesive mass, and thereafter heat treated in a non-reducing, usually an oxidizing, atmosphere (e.g., air). Temperatures of firing are from about 600 to about 700° C., usually not above 650° C. The solid-state reaction takes place during the firing, after which the compound is cooled to room temperature.

Each of the compounds, $TiTe_3O_8$, $ZrTe_3O_8$ and $SnTe_3O_8$, was prepared in the manner just described, wherein the firing temperature was held both at 600 and 700° C. for 20 hours in an air atmosphere. The reaction was complete in the samples prepared at each of these temperatures, as shown by X-ray powder diffraction data. Each of these compounds was found to be insoluble in water and dilute HCl. Each of the compounds was found to be stable up to a temperature of about 750–800° C., but above this temperature after prolonged heating the tellurium begins to oxidize and volatilize as $TeO_3$.

The X-ray powder diffraction data are given in Table I, together with that for $In_2O_3$ for comparison. It will be noted that each compound has a cubic body-centered structure. The experimental densities listed were determined pycnometrically.

TABLE I
X-ray Powder Diffraction Data

| $TiO_2 \cdot 3TeO_2$ | | | $SnO_2 \cdot 3TeO_2$ | | $ZrO_2 \cdot 3TeO_2$ | | $In_2O_3$ | | |
|---|---|---|---|---|---|---|---|---|---|
| d | I/I₁ | hkl | d | I/I₁ | d | I/I₁ | d | I/I₁ | hkl |
| 5.48 | 6 | 200 | 5.59 | 3 | 5.66 | 1 | | | |
| 4.475 | 31 | 211 | 4.575 | 30 | 4.623 | 37 | 4.13 | 13 | 211 |
| 3.87 | 7 | 220 | 3.952 | 1 | 3.99 | 2 | 3.59 | 1 | 220 |
| 3.16 | 100 | 222 | 3.224 | 100 | 3.264 | 100 | 2.921 | 100 | 222 |
| 2.93 | 19 | 321 | 2.983 | 18 | 3.028 | 20 | 2.704 | 2 | 321 |
| 2.738 | 30 | 400 | 2.793 | 37 | 2.831 | 36 | 2.529 | 33 | 400 |
| 2.581 | 19 | 411, 330 | 2.633 | 17 | 2.667 | 19 | 2.385 | 8 | 411, 330 |
| 2.447 | 11 | 420 | 2.498 | 5 | 2.532 | 7 | 2.262 | 2 | 420 |
| 2.342 | 2 | 332 | 2.380 | 2 | 2.404 | 2 | 2.157 | 6 | 332 |
| 2.238 | 2 | 422 | 2.278 | 3 | 2.306 | 2 | 2.066 | 1 | 422 |
| 2.151 | 9 | 510, 431 | 2.191 | 8 | 2.222 | 10 | 1.984 | 10 | 510, 431 |
| 2.002 | 4 | 521 | 2.036 | 3 | 2.07 | 4 | 1.848 | 3 | 521 |
| 1.938 | 28 | 440 | 1.975 | 27 | 2.002 | 26 | 1.788 | 36 | 440 |
| 1.88 | 8 | 530, 433 | 1.91 | 9 | 1.943 | 8 | 1.725 | 3 | 530, 433 |
| 1.827 | 3 | 600, 442 | 1.86 | 3 | 1.888 | 3 | 1.686 | 1 | 600, 442 |
| 1.777 | 8 | 611, 532 | 1.81 | 6 | 1.838 | 8 | 1.641 | 6 | 611, 532 |
| 1.734 | 6 | 620 | 1.765 | 5 | 1.791 | 4 | 1.60 | 2 | 620 |
| 1.691 | 7 | 541 | 1.722 | 6 | 1.748 | 6 | 1.561 | 4 | 541 |
| 1.652 | 26 | 622 | 1.682 | 21 | 1.708 | 25 | 1.525 | 24 | 622 |
| 1.617 | 8 | 631 | 1.645 | 6 | 1.671 | 8 | 1.492 | 6 | 631 |
| 1.583 | 6 | 444 | 1.611 | 4 | 1.634 | 8 | 1.46 | 6 | 444 |
| 1.55 | 7 | 710, 550 | 1.578 | 5 | 1.603 | 5 | 1.431 | 2 | 710, 550, 543 |
| 1.522 | 2 | 640 | 1.551 | 4 | 1.572 | 3 | 1.403 | 2 | 640 |
| 1.491 | 5 | 721, 633 | 1.519 | 4 | 1.542 | 4 | 1.377 | 4 | 721, 633, 552 |
| 1.465 | 4 | 642 | 1.491 | 6 | 1.513 | 5 | 1.352 | 2 | 642 |
| 1.392 | 8 | 732, 651 | 1.418 | 5 | 1.439 | 8 | 1.285 | 3 | 732, 651 |
| 1.37 | 4 | 800 | | | | | 1.265 | 4 | 800 |
| 1.349 | 6 | 811 | 1.395 | 2 | 1.416 | 3 | 1.246 | 3 | 811 |
| 1.33 | 4 | 830 | 1.374 | 5 | 1.395 | 7 | 1.227 | 2 | 820 |
| 1.311 | 4 | 653 | 1.354 | 4 | 1.373 | 5 | 1.209 | 3 | 653 |
| 1.292 | 2 | 822, 660 | 1.325 | 3 | 1.34 | 3 | 1.192 | 2 | 822, 660 |

Body-centered cubic structure, $Mn_2O_3$-type (D 5₃).
Space group $T^5$—I 2₁3

| Z= | 8 | 8 | 8 | 16 |
|---|---|---|---|---|
| $a_0$=A.U  | 10.96 | 11.17 | 11.32±0.01 | 10.118 |
| d(X-ray)=g./ccm | 5.65 | 6.01 | 5.52 | 7.12 |
| d(exp.)=g./ccm | 5.24 | | 5.31 | |

These new crystalline compounds find particular application as pigments and colorants because of their desirable white and yellow colors. They can be used in ceramic glazes, enamels, paints and dyes. Different yellow shades can be obtained by mixing both yellow compounds in various ratios or by mixing with the white $ZrTe_3O_8$. These compounds in powdered form can be incorporated as powders in amounts from, for instance, 0.5 to 10% or even higher as coloring fillers in plastics, such as polyethylene or polystyrene.

As a specific example of a paint formulation incorporating the present colors, the following illustrates this use for the pigments.

| Ingredient: | Lbs. |
|---|---|
| $TiTe_3O_8$ or $SnTe_3O_8$ or $ZrTe_3O_8$ | 300 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% Pb) | 3 |
| Calcium naphthenate (4% Ca) | 2 |
| Total | 994 |

As will be evident to those skilled in the art, various modifications of this invention can be made or followed in the light of the foregoing disclosure and discussion without departing from the spirit and scope of the disclosure or from the scope of the claims.

I claim:
1. A method of making a crystalline oxide compound of the formula $ATe_3O_8$, wherein A is selected from the group consisting of Ti, Sn and Zr, by solid-state reaction which comprises intimately admixing powders of $AO_2$ and $TeO_2$, compacting the resulting admixture into a cohesive mass, and heating said mass at a temperature of from about 600° C. up to the temperature at which said compound begins to decompose at an undesirable rate.

2. A method according to claim 1, wherein the temperature is from 600 to 700° C.

3. A method of claim 1, wherein the molar ratio of $TeO_2$ to $AO_2$ is about 3:1.

References Cited in the file of this patent

UNITED STATES PATENTS

| 2,946,752 | Jonker et al. | July 26, 1960 |
| 3,008,797 | Bither | Nov. 14, 1961 |

OTHER REFERENCES

Mellor: "Comprehensive Treatise on Inorganic and Theoretical Chemistry," Longmans, Green and Co., New York, vol. XI, pages 8 and 81 (1931).